United States Patent [19]

Larsen

[11] Patent Number: 4,745,262

[45] Date of Patent: May 17, 1988

[54] ENERGY CONTROL SYSTEM

[75] Inventor: Laurie E. Larsen, Sydney, Australia

[73] Assignee: Appliance Control Systems (Holdings) Pty. Ltd., Revesby, Australia

[21] Appl. No.: 870,861

[22] Filed: Jun. 5, 1986

[30] Foreign Application Priority Data

Jun. 7, 1985 [AU] Australia .................... PH0962

[51] Int. Cl.$^4$ ................................ H05B 1/02
[52] U.S. Cl. ........................... 219/492; 219/497; 219/501; 219/506; 323/236
[58] Field of Search .................. 219/490–493, 219/497, 494, 501, 506, 508, 509, 514; 323/235, 236

[56] References Cited

U.S. PATENT DOCUMENTS

| 3,959,692 | 5/1976 | Wetzel | 219/497 |
| 4,086,466 | 4/1978 | Scharlack | 323/235 |
| 4,243,875 | 1/1981 | Chang | 219/497 |
| 4,276,603 | 6/1981 | Beck et al. | 219/497 |
| 4,337,388 | 6/1982 | July | 219/497 |
| 4,546,239 | 10/1985 | Sugimori | 219/499 |

Primary Examiner—M. H. Paschall
Attorney, Agent, or Firm—Cushman, Darby & Cushman

[57] ABSTRACT

A control system for controlling the supply of electrical power to a heating element associated with an electrical appliance such as a frypan. The application of power to the heating element is controlled in two distinct modes, a first mode for simmering and a second mode for cooking. The two modes are characterized by a control signal which exhibits control periods having a relatively short duration during the simmer mode and a relatively long duration during the cooking mode. The present invention also delays actuation of a switching element responsive to the control signal in order to compensate for inertial delays caused by the opening and closing of the switching element. The switching element is thus actuated at a time delayed from a zero crossover of an alternating current power supply by an amount corresponding to the opening or closing delay time associated with the switching element such that switching occurs at times which coincide with the zero crossover points of the alternating current power. As a result, a more rapid response and improved control are achieved at relatively low temperature settings while the control of temperature over a broad range is maintained.

22 Claims, 3 Drawing Sheets

ENERGY CONTROL SYSTEM

BACKGROUND OF THE INVENTION

1. Field of the Invention

The present invention relates to a control system and in particular to a control system for electrical energy which is supplied to a load.

The present invention will hereafter be particularly described with reference to domestic appliances such as frypans and the like, although it will be appreciated that it is not thereby limited to such applications. The control system may be readily adapted to other electrical appliances including saucepans, kettles, jugs, toasters and the like.

2. Description of the Prior Art

Currently available controls for electrical appliances, particularly heating appliances, have a disadvantage in that they do not provide adequate control at relatively low temperature settings. A disadvantage of such control systems when used in conjunction with a frypan or saucepan, for example, is that the appliance cannot be set to simmer as it alternatively boils or stops boiling.

SUMMARY OF THE INVENTION

It is an object of the present invention to alleviate the disadvantages of the prior art.

The present invention provides a control system which allows control of temperature over a broad range of settings and a more rapid response. It provides a control system suitable for a frypan or similar appliance and is adapted to regulate the supply of energy to the appliance. The control system of the present invention is particularly advantageous in applications where the electrical energy is supplied to the appliance in pulsed form.

The control system includes a temperature sensing means which may be adapted to monitor, inter alia, the temperature of the base of the appliance. The temperature sensing means may include a sensor in the form of a temperature responsive element preferably comprising a high temperature thermistor or thermocouple. The temperature responsive element may be embedded in a heat conducting relationship with the base or other heat producing part of the appliance.

The control system of the present invention also includes a setting means which may comprise a control panel including a keyboard and/or switch elements. The keyboard or switch elements may be used by an operator to select the required operating temperature and/or cooking period. An on/off switch for the appliance may be provided on the control panel.

The control system further includes processor means which preferably incorporates a control unit and a memory store. The processor means preferably includes a microprocessor and may include a read only memory (ROM). The microprocessor and ROM may comprise a single chip microcomputer. In one form the processor means may comprise a four bit user programmable microcomputer such as a Texas Instruments device type TMS 1000.

The present invention further includes power switching means adapted to switch or regulate electrical power to the load, which may comprise a heating resistance element. The processor means may operate the switching means to regulate supply of power to the load. The switching means preferably comprises a mechanical switching element such as a relay, contactor or interruptor. Solid state switching elements such as triacs also may be used. However, current demands of heating elements associated with appliances of interest are such that use of mechanical switching elements is preferred.

Mechanical switching elements, when switched on or off, cause arcing problems at the contacts if the element is switched under load or when there is any considerable voltage across the contacts. Arcing not only greatly reduces life expectancy and reliability of the switching elements but additionally generates undesirable large voltage spikes and radio frequency interference (R.F.I.).

The present invention recognizes that both arcing and R.F.I. caused by switching relays and similar switching elements may be eliminated or at least significantly reduced by arranging switching of the element so that it takes place substantially during a zero crossing of an alternating current power supply. The voltage at the zero crossing is equal to 0 V. but may peak at 155 v A.C. power supply or at 339 v with a 240 v A.C. power supply.

The present invention includes means for detecting these zero crossings of the power supply. Means for detecting zero crossings may be provided in any suitable form. In one form a 50 Hz (or 60 Hz) square wave signal may be derived from the power supply waveform for timing purposes (of an associated microprocessor) and for generating a zero crossing reference signal.

It is well known that relays and similar switching elements when switching on or off exhibit an inherent time delay between energizing and closing of the contacts or de-energizing and opening of the contacts. This delay is usually on the order of milliseconds and can vary from relay to relay. Release times are usually different from operate times. Thus, the present invention includes means for delaying the zero crossing reference signal. Preferably the delay is variable. In one form the delay may be variable over at least half a main cycle period.

Means for delaying the zero crossing reference signal may be provided in any suitable form. In one form a software loop may be set up in a processor unit to countdown the desired time after detection of the zero cross-over (Z.C.O.). The software may include different time delays for switching the relay on and off respectively. Inputs may be set up to vary these times for different brands or types of relays.

Time delay may be variably controlled by a feedback signal representing the actual phase relationship of the zero crossing at the instant of switching. Feedback may be provided by direct storage of an inductive line induced transient level as a charge on a capacitor, the charge contributing to the total charge which determines net delay. In this form, the stored charge may be passed by a switch to another capacitor used to generate the compensating delay, providing negative feedback for contacts opening at or around the end of a negative half cycle. Alternatively, feedback may be provided by storing the charge and converting this to digital form representing the transient value. The letter information may be processed numerically to produce a revised net delay.

Feedback may also be provided via a sampling technique involving sampling of line voltage at the instant of switching. These samples may be processed as a signal or numerically to provide the desired feedback information. Alternatively, the delay may be provided by conventional timers. These may be provided in integrated circuit form or with discrete components. An LC or RC timing network may be included to generate a suitable time delay. In one form a capacitor may be charged through a resistor after Z.O.C. detection. Upon reaching a set threshold the relay may be switched on or off.

It will be appreciated that the time constant and hence time delay associated with an RC network may be readily altered by changing the value of the resistor. In one form a variable resistor such as a potentionmeter may be used.

In practice the time delay associated with a given relay varies with the temperature of the relay. Temperature changes may be due to ambient conditions or as the result of warming up due to the operation of the relay. The above temperature changes may be substantially compensated for by providing a temperature responsive element as part of the timing network. In one form a thermistor or similar device may be associated with the resistor of, e.g., the RC network described above. The thermistor or similar device may be provided in series or in parallel with the resistor depending on the nature of the response gradient of the thermistor.

The time delay associated with a given relay may also vary with aging. In applications where the line source impedance may be safely assumed as inductive, feedback of actual opening time of the relay contacts may be gained by sampling the resulting transient. This stored signal or value is most readily used to provide correction to an initial delay value in a form which allows the transient level to contribute to a second voltage level being used to generate a delay through an RC network, and in which contact opening is occuring at the end of negative half cycles only.

In this form, premature contact opening results in a large negative transient, which diminishes the second voltage level, increasing the delay for a subsequent contact opening. Likewise, the large positive transient from late opening increases the second level and shortens the compensating delay. In another form, the processor samples and stores the size of the voltage transient, and the correction to the delay is done in software.

Switching of the contacts precisely on the zero crossover, however, can create another problem such as oxidation. According to a further aspect of the present invention the latter problem may be alleviated or substantially reduced by providing a 'wetting' current through the contacts. The wetting current may be provided in any suitable form. Preferably the wetting current is provided by switching the contacts close to but not precisely on the zero cross-over. The abovementioned time delay means may be adjusted upwardly or downwardly to provide the necessary wetting current through the relay contacts.

Significant flexibility is possible in the application of an apparatus according to the present invention to different relays and/or main frequencies because the time delay may be readily altered by changing or selecting a resistor value.

Where the switching element is associated with a microprocessor or microprocessor based control system, the above described method may be independent of the clock speed of the processor. The microprocessor may be adapted to select one of two or more resistors to charge a capacitor, thus permitting different operate/release times to be obtained and independently altered. In one form the capacitor of the time delay means may also serve as an integrator in an analogue-to-digital convertor associated with the microprocessor based control system.

The processor means of the present invention may be adapted to operate the switching means in at least two different modes. The processor means may be adapted to operate the switching means in a first or simmer mode when simmering is required and in a second or cooking mode when simmering is not required. The simmer mode requires relatively fine control of temperature. Accordingly, the processor means may be adapted to operate the switching means during the simmer mode at a frequency or frequencies which are relatively higher than those employed in the second or cooking mode. The processor means may be adapted to operate the switching means during the simmer mode at a frequency substantially between 0.2 Hz and 1.0 Hz. This corresponds to control periods substantially between 5 seconds and 1 second, respectively. In one form the processor means is adapted to operate the switching means during the simmer mode at a frequency of approximately 0.33 Hz, corresponding to a control period of 3 seconds.

During the cooking mode the processor means may be adapted to operate the switching means at a relatively lower frequency, e.g., between 0.01 Hz and 0.17 Hz. The latter corresponds to control periods substantially between 100 seconds and 6 seconds, respectively. The processor means may be adapted during the cooking mode to limit the operating frequency to a specific range or value. In one form the processor means may be adapted to limit the operating frequency to less than approximately 0.17 Hz. The actual rate may be determined by the thermal time constant of the heating element and thermal path to the temperature sensor. Typically the operating frequency may be substantially 0.02 Hz.

The simmer mode may be manually or automatically selectable. Manual selection may be effected via a switch element incorporated in the control panel. Automatic simmer mode may be dependent on set temperature. In one form the processor means may be arranged to operate the switching means in a simmer mode whenever the set temperature is below a predetermined or simmer threshold. The simmer threshold preferably is greater than 100° C. at sea level. In one form the simmer threshold may be substantially 120° C.

The processor means may be adapted to determine the duration that power should be applied to the load and to operate the switching means accordingly. In one form (first mode) the processor means may be adapted to determine a duty cycle between zero and one hundred and fifty (or 180) cycles to be applied to the load each three seconds. In another form (second mode) the processor means may be adapted to determine on and off periods as a multiple of 3 seconds. The processor means preferably determines the duty cycle (first mode) and duration on or off (second mode) by reference to the temperature difference between the temperature setting means and the temperature-sensing means. In the first mode the duty cycle may be linearly related to the abovementioned temperature differences whilst in the second mode the switching frequency preferably is less than 0.17 Hz and typically may be 0.02 Hz.

The control system of the present invention may include display means. The display means may comprise one or more display elements such as light emitting diodes or liquid crystal elements to indicate to the operator the state of the control system. The display means may be adapted to display time remaining, heating in progress, appliance at chosen temperature, over-/under temperature, etc.

The control system of the present invention also may include audible warning means. The audible warning means may comprise a piezo buzzer tuned to any convenient frequency. The audible warning means may be associated with the display means to provide audible warning of temperature changes of the appliance.

According to one aspect of the present invention there is provided a control system for controlling a supply of electrical power to a heating element associated with electrical appliances such as frypans and the like, the control system being adapted to control a supply of electrical power in a first mode for simmering and in a second mode for cooking the load and comprising:

sensing means arranged in heat conducting relationship with the heating element for sensing temperature thereof;

setting means for setting the required operating temperature for the appliance;

microprocessor means receiving outputs from the sensing means and the setting means and adapted to provide a control signal in the first mode comprising control periods each having a first duration and a control signal in the second mode having control periods each having a second duration, the second duration being relatively greater than the first duration; switching means for switching the supply of electrical power under control of the control signal, wherein the microprocessor means provides in the first mode a control signal having a duty cycle which is related to the difference between the temperature of the setting means and the temperature of the sensing means.

According to another aspect of the present invention there is provided a method of switching a relay or similar switching element, which exhibits a closing/opening delay time following actuation, the relay or element being adapted to switch a supply of alternating current electrical power, wherein the relay of similar element is switched at a time delayed from a zero cross-over of the alternating current power, the delayed time corresponding to the closing/opening delay time associated with the relay or element.

BRIEF DESCRIPTION OF THE DRAWINGS

A preferred embodiment of the present invention will now be described with reference to the accompanying drawings wherein.

DETAILED DESCRIPTION OF THE PREFERRED EMBODIMENT

Figure 1:
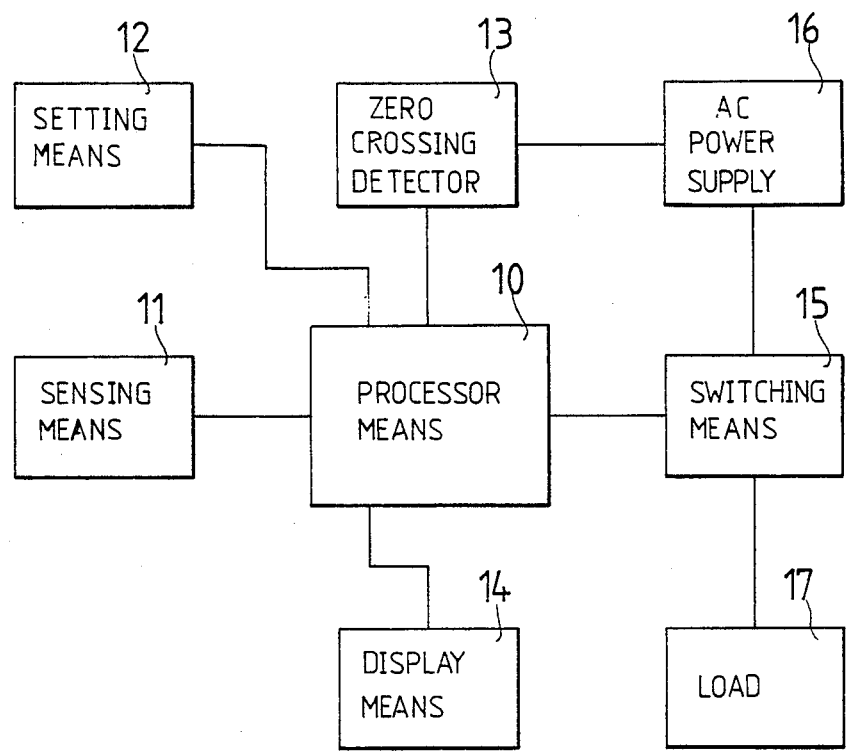
FIG. 1 shows a functional diagram of an energy control system incorporating the present invention.

Referring to FIG. 1 an energy control system in accordance with the present invention is shown incorporating processor means 10, temperature sensing means 11, operator setting means 12, zero-crossing detector 13, display means 14 and switching means 15. The control system is adapted to regulate the supply of power from power supply 16 to load 17.

Figure 2:
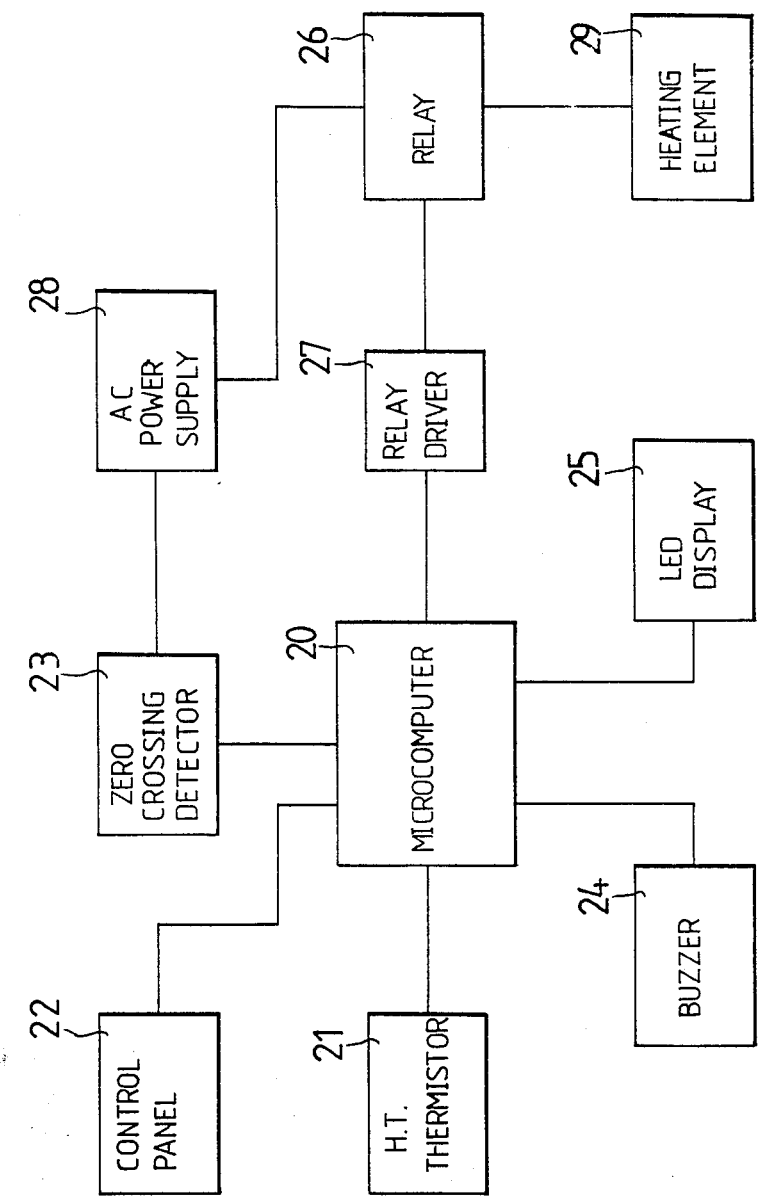
FIG. 2 shows a functional diagram of an energy control system according to an aspect of the present invention.

Referring to FIG. 2 a preferred frypan heating control arrangement according to the present invention comprises microcomputer 20 and a high temperature thermistor 21 connected thereto. A control panel 22, zero-crossing detector 23, buzzer 24 and visual (LED) display 25 are also connected to microcomputer 20. Microcomputer 20 is connected to a relay switch 26 via a suitable driver 27. The relay switch 26 is connected between the AC main supply 28 and the heating element 29 of the appliance.

Figure 3:
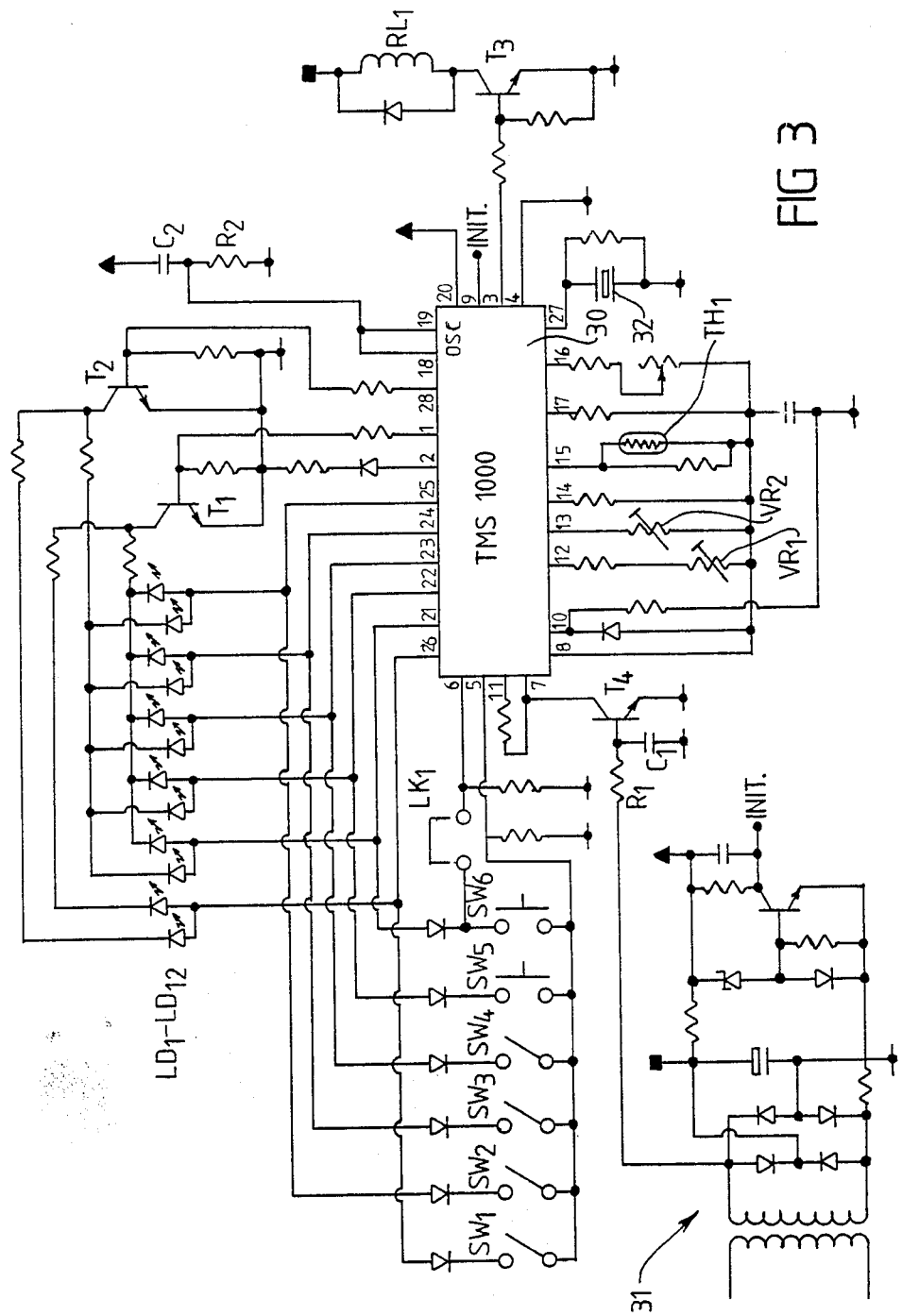
FIG. 3 shows in schematic form a heating control circuit for a frypan or similar appliance in accordance with a preferred embodiment of the present invention.

The energy control circuit of FIG. 2 is shown in more detail in FIG. 3. The energy control circuit of FIG. 3 includes a four bit mask programmed microcomputer 30. The microcomputer 30 is connected to a suitable power supply shown generally at 31 via pins 4 and 20.

The operator control panel 22 includes cooking period selector switches SW1–SW4, long or short timing mode switch SW5 and on/off switch SW6.

The display means 25 includes a plurality of LED diodes LD1–LD12. Diodes LD1–LD12 are multiplex driven by microcomputer 30 via driver transistors T1, T2.

The temperature sensing means 21 comprises thermister TH1 connected to pin 15 of microcomputer 30.

Pin 3 of microcomputer 30 supplies trigger pulses to the winding of relay switch RL1 via driver transistor T3. The trigger pulses are supplied by microcomputer 30 at each zero crossing to minimize switching current and associated contact wear and RF1. Supply of trigger pulses is referenced to a zero cross-over input (pin 7) to the microcomputer. The input reference is derived from the power supply via square wave generating circuit comprising transistor T4, resistor R1 and capacitor C1.

Microcomputer 30 adjusts the heat input every control period. In the simmer mode, microcomputer 30 switches relay RL1 by selecting a proportion of the AC power during each control period. In the cooking mode, the control period may be discretely variable multiples of approximately 3 seconds, thermal delays typically setting the control period during the cooking mode to approximately 50 seconds. Below 120° C. the simmer mode may be automatically enabled.

Internal clock frequency is set by external timing elements comprising resistor R2 and capacitor C2. A removable link LK 1 is included for changing over operating frequency from 50 Hz to 60 Hz.

The microcomputer 30 is adapted to delay the zero crossing reference for respectively switching the relay on and off. The delay duration is set externally via potentionmeter VR1 for relay opening adjustment and VR2 for relay closing adjustment. The externally set delays independently compensate for the relay operation and release times. VR1 and VR2 are matched to the operate/release times of relay RL1 and are set during manufacture.

Finally, a buzzer 32 is connected to pin 27 to provide audible warning of temperature changes.

It will be appreciated that various alterations, modifications and/or additions may be introduced into the constructions and arrangements of parts previously described without departing from the spirit or ambit of the invention.

What is claimed is:

1. A frypan control system for controlling a supply of electrical power to a heating element associated with said frypan, said control system being adapted to control said supply of power in a first mode for simmering and in a second mode for cooking, comprising:

sensing means arranged in a heat conducting relationship with said heating element for sensing the temperature of said heating element;

setting means for setting the required operating temperature for said frypan;

microprocessor means receiving output from said sensing means and said setting means for providing in said first mode a control signal comprising control periods each having a first duration and a duty cycle which is related to the difference between the temperature of said setting means and the temperature of said sensing means, and in said second mode a control signal comprising control periods each having a second duration, said second duration being greater than said first duration; and switching means responsive to said control signals for switching said supply of electrical power to said heating element for control periods having said first duration and duty cycle in said first mode and for control periods having said second duration in said second mode.

2. A control system according to claim 1, further including at least one switch operatively connectable to said microprocessor means for selecting between said first and said second modes.

3. A control system according to claim 1, wherein said microprocessor means operates in said first mode when the temperature set by said setting means is below a predetermined threshold and operates in said second mode when the temperature set by said setting means is above said threshold.

4. A control system according to claim 1, wherein said first duration is substantially between 1 second and 5 seconds and wherein said second duration is substantially between 10 seconds and 100 seconds.

5. A control system according to claim 4, wherein said first duration is substantially 3 seconds and said second duration is substantially 50 seconds.

6. A control system according to claim 1, wherein said setting means comprises one or more switch elements.

7. A control system according to claim 1, wherein said sensing means comprises a high temperature thermistor in a heat conducting relationship with said load.

8. A control system according to claim 1, wherein said switching means comprises a relay connected between said supply of electrical power and said heating element.

9. A control system according to claim 1, wherein said microprocessor means comprises a microcomputer.

10. A control system according to claim 1, further including a display operatively connectable to said microprocessor, said display means comprising at least one light emitting diode or liquid crystal element.

11. A control system according to claim 1, further including an audible warning means operatively connectable to said microprocessor means for providing an audible warning of temperature changes of said heating element.

12. A control system according to claim 1, wherein said supply of electrical power is alternating current and wherein said control signal operates said switching means at or near a zero cross-over of the alternating current power.

13. A control system according to claim 12, wherein said microprocessor means operates said switching means at a time delayed from said zero cross-over.

14. A control system according to claim 8 wherein said supply of electrical power is alternating current and wherein said control signal operates said switching means at or near a zero cross-over of the alternating current power.

15. A control system according to claim 14 wherein said microprocessor means is adapted to open said relay after a first delay from zero cross-over, said first delay corresponding to the opening time of said relay.

16. A control system according to claim 1, wherein said processor means provides in said second mode a control signal having a duty cycle which is related to the difference between the temperature of said setting means and the temperature of said sensing means.

17. A control system according to claim 15 wherein said microprocessor means is adapted to close said relay after a second delay from zero cross-over, said second delay corresponding to the closing time of said relay.

18. A method of switching a switching element which exhibits a closing/opening delay time following actuation, said switching element controlling a supply of alternating current electrical power to a load, wherein said switching element is actuated at a time delayed from a zero cross-over of the alternating current power by a feedback technique, said feedback being provided by cumulative storage of inductive supply induced transients as a charge level on a capacitor, said delayed time corresponding to said closing/opening delay time associated with said switching element.

19. A method according to claim 18 wherein said switching element is switched open after a first delay from said zero cross-over.

20. A method according to claim 19 wherein said switching element is switched closed after a second delay from said zero cross-over.

21. A method according to claim 18 wherein said feedback is provided by converting said charge level to digital form and processing the resulting digital signal numerically.

22. A method according to claim 18 further including the step of sampling supply voltage at the instant of switching and processing the sampled voltage.

* * * * *